(12) United States Patent
Kim (10) Patent No.: US 8,734,979 B2
(45) Date of Patent: May 27, 2014

(54) BATTERY MODULE

(75) Inventor: Myung-Chul Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 259 days.

(21) Appl. No.: 13/230,612

(22) Filed: Sep. 12, 2011

(65) Prior Publication Data

US 2012/0282516 A1 Nov. 8, 2012

(30) Foreign Application Priority Data

May 2, 2011 (KR) .................. 10-2011-0041598

(51) Int. Cl.
*H01M 2/10* (2006.01)
(52) U.S. Cl.
USPC ........................................... 429/159; 429/99
(58) Field of Classification Search
None
See application file for complete search history.

(56) References Cited

U.S. PATENT DOCUMENTS

| | | | | |
|---|---|---|---|---|
| 3,933,522 | A * | 1/1976 | Steig | 429/80 |
| 6,326,103 | B1 * | 12/2001 | Ido et al. | 429/156 |
| 6,586,132 | B1 * | 7/2003 | Fukuda et al. | 429/120 |
| 2002/0021107 | A1 * | 2/2002 | Ripoll Anton et al. | 320/112 |
| 2009/0236162 | A1 * | 9/2009 | Takasaki et al. | 180/68.5 |
| 2009/0305116 | A1 | 12/2009 | Yang et al. | |
| 2010/0000816 | A1 | 1/2010 | Okada | |
| 2010/0047676 | A1 | 2/2010 | Park et al. | |
| 2010/0215998 | A1 | 8/2010 | Byun et al. | |
| 2011/0097614 | A1 * | 4/2011 | Kim | 429/53 |
| 2011/0151314 | A1 | 6/2011 | Ogawa | |
| 2012/0270095 | A1 * | 10/2012 | Kim | 429/159 |

FOREIGN PATENT DOCUMENTS

| | | |
|---|---|---|
| EP | 0952620 A1 | 10/1999 |
| EP | 1164645 A1 | 12/2001 |
| EP | 2315293 A1 | 4/2011 |
| JP | 2005-302590 | 10/2005 |
| JP | 2009-231115 | 10/2009 |
| JP | 2010-49808 | 3/2010 |
| JP | 2010-153130 | * 7/2010 |
| JP | 2011-023301 | 2/2011 |
| KR | 10-0590050 B1 | 6/2006 |
| KR | 10-2007-0112489 | 11/2007 |
| KR | 10-2008-0013040 | 2/2008 |
| KR | 10-2010-0005666 | 1/2010 |

OTHER PUBLICATIONS

Extended European Search Report dated Jul. 27, 2012 in European application No. 11192984 (6 pps).

* cited by examiner

*Primary Examiner* — Jonathan Crepeau
(74) *Attorney, Agent, or Firm* — Christie, Parker & Hale, LLP (57) ABSTRACT

A battery module includes a pair of end plates; a plurality of battery cells aligned with each other between the pair of the end plates, wherein each of the battery cells has a top surface, a bottom surface located substantially opposite to the top surface, and side surfaces extending between the top surface and the bottom surface; a top plate having a top base portion extending across the top surface of the battery cells and a top flange portion covering at least a portion of the side surfaces of the battery cells; and a bottom plate having a bottom base portion extending across the bottom surface of the battery cells and a bottom flange portion covering at least a portion of the side surfaces of the battery cells.

14 Claims, 8 Drawing Sheets

BATTERY MODULE

CROSS-REFERENCE TO RELATED APPLICATION

This application claims priority to and the benefit of Korean Patent Application No. 10-2011-0041598, filed on May 2, 2011, in the Korean Intellectual Property Office, the entire content of which is incorporated herein by reference.

BACKGROUND

1. Field

An aspect of the present invention relates to a battery module.

2. Description of Related Art

In general, battery cells are used as energy sources for mobile devices, electric vehicles, hybrid vehicle and the like. The battery cells vary based on shape and size depending on the types of external devices to which the battery cells are applied.

A small-sized mobile device such as a cellular phone can be operated with the output and capacity of a single battery cell for a certain period of time. However, in a case where an external device such as an electric vehicle or hybrid vehicle requires long-term and high-power driving, a large-capacity battery module is configured by electrically connecting a plurality of battery cells so as to increase the output and capacity of the battery cells. The battery module may increase the output voltage or output current of the battery cells depending on the number of the battery cells built therein. In addition, a battery pack may be configured by electrically connecting a plurality of battery modules.

SUMMARY

Embodiments provide a battery module in which upper and lower plates are respectively extended to sides thereof, thereby preventing up, down, left and right movements of battery cells, i.e., preventing the movement of the battery cells with respect to each other.

Embodiments also provide a battery module having excellent insulating performance by forming upper and lower plates with an insulating complex.

According to an aspect of the present invention, a battery module includes a pair of end plates; a plurality of battery cells aligned with each other between the pair of the end plates, wherein each of the battery cells has a top surface, a bottom surface located substantially opposite to the top surface, and side surfaces extending between the top surface and the bottom surface; a top plate having a top base portion extending across the top surface of the battery cells and a top flange portion covering at least a portion of the side surfaces of the battery cells; and a bottom plate having a bottom base portion extending across the bottom surface of the battery cells and a bottom flange portion covering at least a portion of the side surfaces of the battery cells.

The top flange portion of the top plate and the bottom flange portion of the bottom plate may be formed to be spaced apart from each other at a predetermined interval.

The top and bottom plates may be formed of a material having an insulation property.

The top and bottom plates may include at least one selected from the group consisting of acrylonitrile butadiene styrene (ABS), polystyrene (PS), polypropylene (PP), polyimide (PI) and polyethylene (PE).

Guide portions respectively provided on correspond to the battery cells on a surface that confronts the battery cells may be provided on at least one of the top and bottom plates. The guide portion may guide the position of each of the battery cells.

The pair of the end plates may further include fastening holes formed at portions that come in contact with one end and the other end of the top and bottom plates.

Fastening grooves respectively formed at portions corresponding to the fastening holes may be provided on at least one of the top and bottom plates.

The fastening hole and the fastening groove may be fastened by a fastening member.

The fastening member may include a bolt or stud.

The battery module may further include barriers respectively interposed between the plurality of battery cells. At least one opening positioned to correspond to the barrier may be provided on the bottom plate.

A plurality of first ribs may be provided on one outer surface of the top or bottom flange portion.

Second ribs respectively formed to correspond to spaces between the plurality of first ribs may be provided on another outer surface of the top or bottom flange portion.

The battery module may further include a top cover that covers a top of the top plate.

At least one projection portion may be provided on the top cover.

A projection accommodating portion formed at a position corresponding to the projection portion may be provided on the bottom base portion of the bottom plate.

As described above, according to the present invention, the number of components is decreased by extending top and bottom plates to their sides, so that it is possible to reduce the manufacturing cost of a battery module and to prevent up, down, left and right movements of battery cells.

Also, the top and bottom plates are formed of an insulating complex, so that it is possible to cause a short circuit between electrode terminals or bus-bars of the battery cells.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements located therebetween. Also, when an element is referred to as being "connected to" another element, it can be directly connected to the another element or be indirectly connected to the another element with one or more intervening elements located therebetween. Hereinafter, like reference numerals refer to like elements. In the drawings, the thickness or size of layers are exaggerated for clarity and not necessarily drawn to scale.

Figure 1:
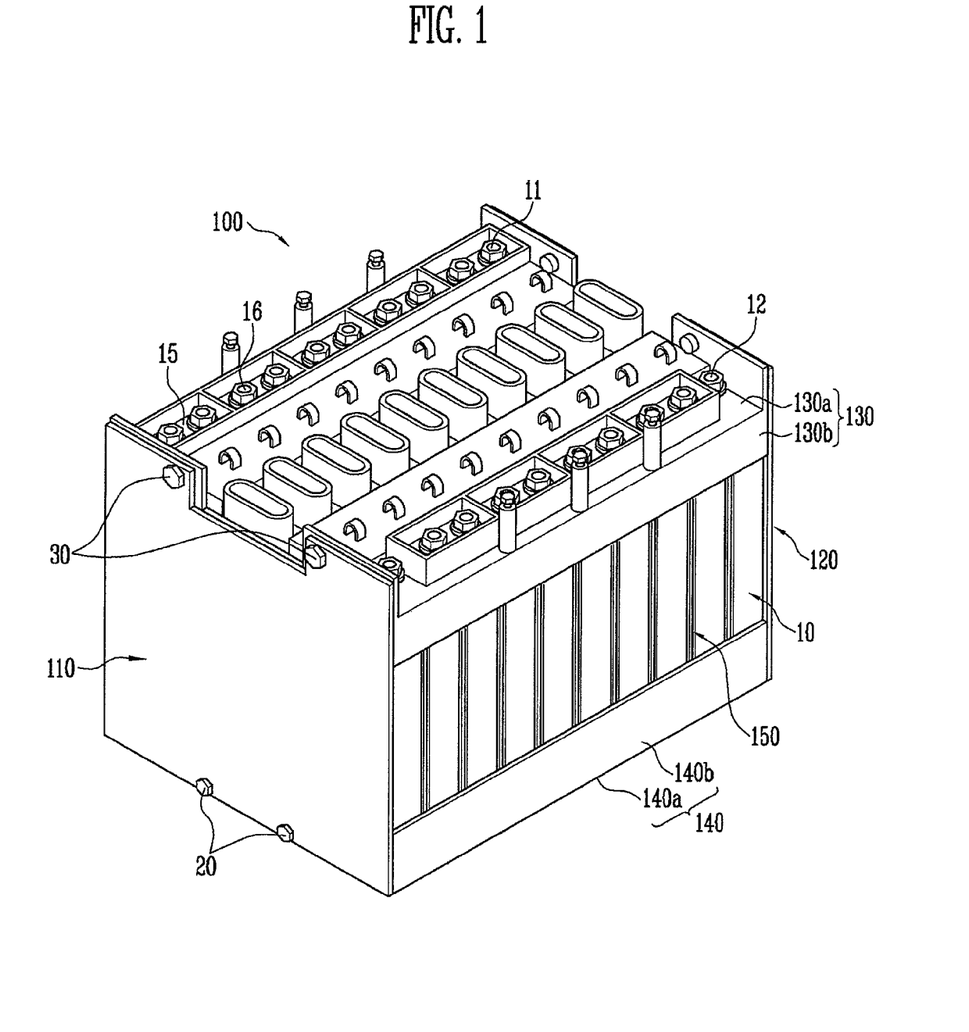
FIG. 1 is a perspective view of a battery module according to a first embodiment of the present invention.
Figure 2:
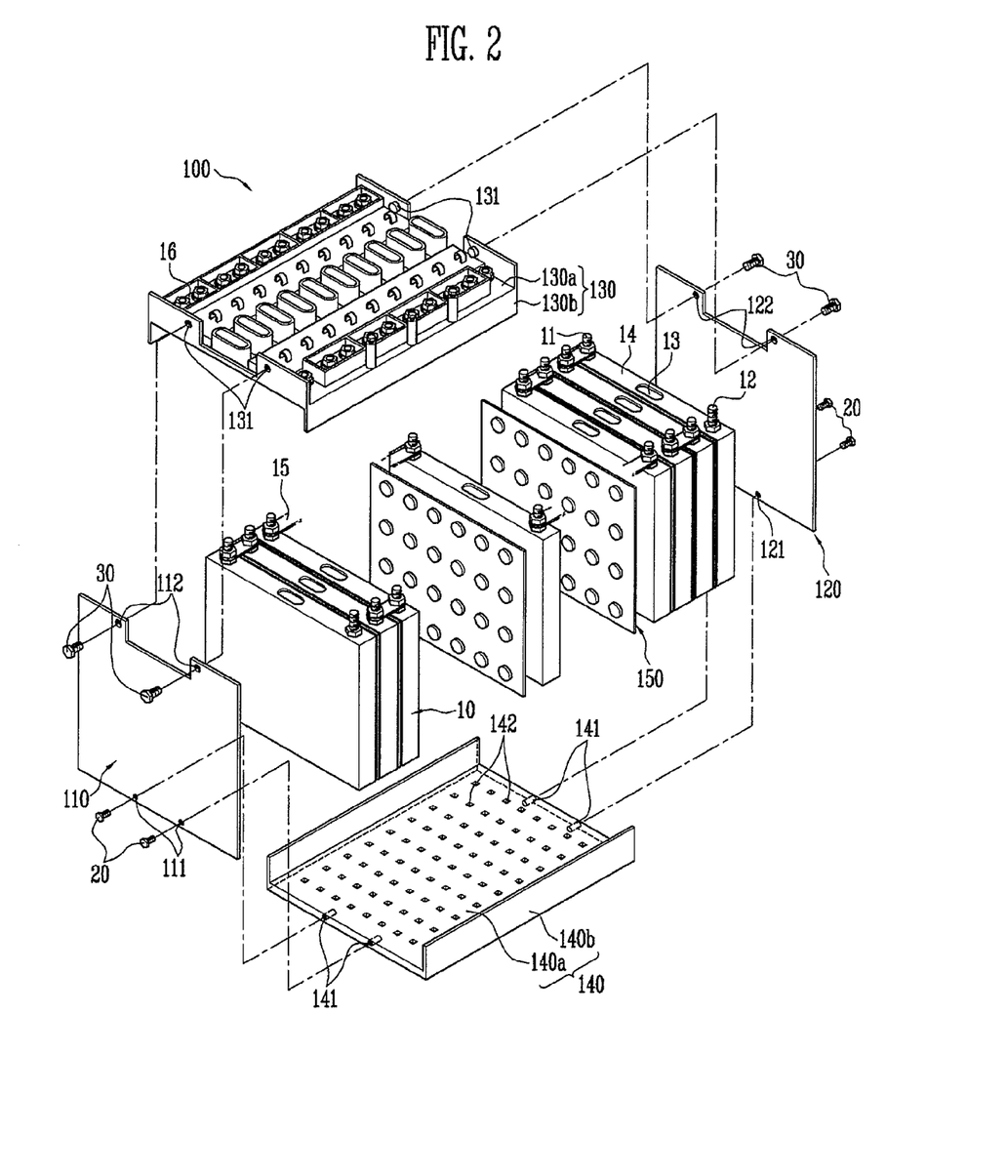
FIG. 2 is an exploded perspective view of the battery module of FIG. 1.

FIG. 1 is a perspective view of a battery module according to a first embodiment of the present invention. FIG. 2 is an exploded perspective view of the battery module according to the first embodiment of the present invention.

Referring to FIGS. 1 and 2, the battery module 100 according to this embodiment includes a plurality of battery cells 10, a pair of end plates 110 and 120, a top plate 130 and a bottom plate 140.

Here, the plurality of battery cells 10 are aligned in one direction between the pair of the end plates 110 and 120. The top plate 130 is provided with a top base portion 130a configured to confront and/or cover top surfaces of the plurality of battery cells 10, and a top flange portion 130b bent to side surfaces of the battery cells 10 from a side of the top base portion 130a. The bottom plate 140 is provided with a bottom base portion 140a disposed to confront and/or cover bottom surfaces of the plurality of battery cells 10, and a bottom flange portion 140b bent to the side surfaces of the battery cells 10 from a side of the bottom base portion 140a.

The top and bottom base portions 130a and 140a contact the top and bottom ends, respectively, of each of the end plates 110 and 120. Thus, the top and bottom base portions 130a and 140a can support the plurality of battery cells 10. The top and bottom flange portions 130b and 140b may be bent approximately perpendicular to the top and bottom base portions 130a and 140a, respectively. That is, the top and bottom flange portions 130b and 140b may be extended while coming in contact with the side surfaces of the battery cells 10.

The battery cell 10 may generate heat in a charging/discharging process thereof, and the generation of heat may promote deterioration of the battery cell 10. Particularly, in a case where the battery cell 10 is a high-capacity battery cell, the generation of heat may be problematic in safety of the battery cell 10, and therefore, it is necessary to control the generation of heat. Accordingly, the top flange portion 130b of the top plate 130 and the bottom flange portion 140b of the bottom plate 140 may be spaced from each other. Thus, heat generated from the plurality of battery cells 10 can be dissipated through a space between the top and bottom flange portions 130b and 140b.

The plurality of battery cells 10 can be firmly fixed by the top and bottom flange portions 130b and 140b without side plates. That is, the top and bottom flange portions 130b and 140 according to this embodiment can prevent up, down, left and right movements of the plurality of battery cells 10, i.e., the flange portions can prevent movement of the battery cells with respect to each other and with respect to the battery module housing. Particularly, the top and bottom flange portions 130b and 140 are formed, so that it is possible to prevent the plurality of battery cells 10 from being separated in up, down, left and right directions.

Generally, the top and bottom plates 130 and 140 of the battery module 100 are manufactured using a material with a high strength, such as steel, to support the weight of the plurality of battery cells 10. However, the battery module manufactured using steel or the like may be heavy. Since it may not be easy to deal with steel, it is difficult to manufacture the battery module having a desired shape, and therefore, the production cost of the battery module is increased.

Thus, the top and bottom plate's 130 and 140 according to this embodiment may be formed of a material having an insulation property, and specifically an electrically insulating property. For example, the top and bottom plates 130 and 140 may include at least one selected from the group consisting of acrylonitrile butadiene styrene (ABS), polystyrene (PS), polypropylene (PP), polyimide (PI) and polyethylene (PE).

The bottom base portion 140a of the bottom plate 140 supports the bottom surfaces of the battery cells 10, and may include at least one opening 142. The battery module 100 may further include barriers 150 located between each of the plurality of battery cells 10. In one embodiment, the opening 142 of the bottom plate 140 may be formed at a position generally corresponding to the barrier 150. The barrier 150 is provided between neighboring battery cells 10, so that a space can be provided between the neighboring battery cells 10. The space may serve as a path for dissipating heat or a path of coolant for exchanging heat with the battery cell 10 so that the heat generated in the battery cell 10 is not accumulated.

The battery cell 10 may be manufactured by accommodating an electrode assembly and an electrolyte in a battery case and then sealing the battery case with a cap plate 14. The cap plate 14 may include positive and negative electrode terminals 11 and 12 respectively provided on both ends on the cap plate 14, and a vent 13 provided between the terminals 11 and 12. The electrode assembly may be composed of a positive electrode plate, a negative electrode plate, and a separator between the electrode plates. The positive electrode plate is connected to the positive electrode terminal 11, and the negative electrode plate is connected to the negative electrode terminal 12. Thus, energy generated by an electrochemical reaction between the electrode assembly and the electrolyte is transferred to the outside of the battery cell 10. The vent 13 serves as a path through which gas generated in the inside of the battery cell 10 is exhausted to the outside of the battery cell 10.

The pair of the first and second end plates 110 and 120, the top plate 130 and the bottom plate 140 accommodate the plurality of battery cells 10 which may be encompassed in a space defined by the plates. In one embodiment, the battery cells 10 are aligned in parallel so that wide front surfaces of the battery cells are opposite to each other (i.e., the wide front surfaces face each other). The positive and negative electrode terminals 11 and 12 of neighboring two battery cells 10 may be electrically connected to each other through a bus-bar 15. The bus-bar 15 is provided with holes through which the positive and negative electrode terminals 11 and 12 penetrate. The bus-bar 15 through which the terminals penetrate may be fixed by members such as nuts 16.

The first and second end plates 110 and 120 contact the outermost battery cells 10. Thus, the first and second end plates 110 and 120 can apply pressure to the inside of the plurality of battery cells 10. In other words, the end plates 110, 120 compress the battery cells 10 together. In one embodiment, the plurality of battery cells 10 supported by the first and second end plates 110 and 120, the top plate 130 and the bottom plate 140 may be connected in series to one another by alternately aligning the positive and negative electrode terminals 11 and 12.

In one embodiment, the pair of the end plates 110 and 120 may be provided with fastening holes 111, 112, 121 and 122 formed at portions that contact ends of the top and bottom plates 130 and 140. The top and bottom plates 130 and 140 may be provided with fastening grooves 131 and 141 formed at portions corresponding to the fastening holes 111, 112, 121 and 122.

The fastening holes 111, 112, 121 and 122 and the fastening grooves 131 and 141 may be fastened by fastening members 20 and 30. More specifically, the fastening holes 111, 112, 121 and 122 and the fastening grooves 131 and 141 are penetrated and fastened by the fastening member 20 and 30 so that it is possible to improve the bonding force among the pair of the end plates 110 and 120, the top plate 130 and the bottom plate 140. For example, the fastening members 20 and 30 may include bolts or studs.

As described above, the fastening through fastening holes 111, 112, 121 and 122 and the fastening grooves 131 and 141 makes it advantageous to simplify the external appearance of the battery module 100 and minimize the size of the battery module 100, thereby improving the degree of space utilization. The fastening holes 111, 112, 121 and 122 and the fastening grooves 131 and 141 can effectively disperse stress generated by the plurality of battery cells 10, which is concentrated on the top or bottom plate 130 or 140, thereby improving the safety of the battery module 100.

In one embodiment, the pair of the end plates 110 and 120, the top plate 130, or the bottom plate 140 constitutes a kind of housing for stably fixing the plurality of battery cells 10, and its shape or number may be variously modified according to the design target of the battery module 100. However, the present invention is not limited to this embodiment.

Figure 3:
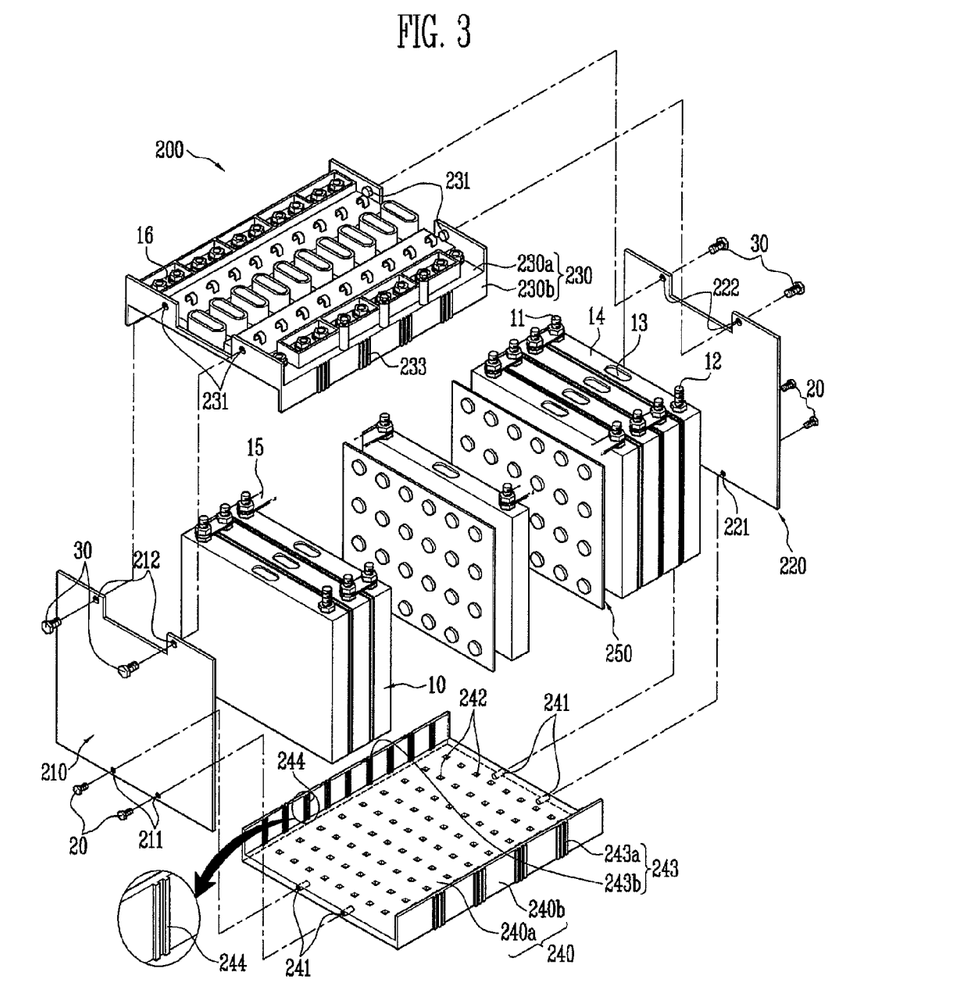
FIG. 3 is an exploded perspective view of a battery module according to a second embodiment of the present invention.

FIG. 3 is an exploded perspective view of a battery module according to a second embodiment of the present invention. In the description of FIG. 3, descriptions of components identical to those of the first embodiment will be omitted.

Referring to FIG. 3, in the battery module 200 according to this embodiment, a plurality of first ribs 233 are provided on one outer surface of a top flange portion 230b. A plurality of first ribs 243a are provided on one outer surface of a bottom flange portion 240b, and second ribs 243b respectively formed to correspond to the plurality of first ribs 243a are provided another outer surface of the bottom flange portion 240b. In one embodiment, second ribs formed to generally correspond to the plurality of first ribs 233 may be further provided on another outer surface of the top flange portion 230b.

The first ribs 233 and 243a and the second ribs 243b, respectively provided on the top and bottom flange portions 230b and 240b can reinforce the strength of top and bottom plates 230 and 240. When a battery pack is implemented, the first ribs 233 and 243a and the second ribs 243b may function to allow neighboring battery modules 200 to be fastened to each other without another fastening member. This will be described in detail with reference to FIGS. 6A and 6B.

In one embodiment, a guide portion 244 may be provided on a surface that confronts the battery cells 10 in at least one of the top and bottom plates 230 and 240. The guide portion 244 generally corresponds to the battery cells 10, and guides the position of the battery cells 10. In other words, the guide portion 244 may be provided on at least one of a top base portion 230a or the top flange portion 230b of the top plate 230 and a bottom base portion 240a or the bottom flange portion 240b of the bottom plate 240. Although it has been illustrated in this embodiment that the guide portion 244 is provided on the bottom flange portion 240b of the bottom plate 240, the present invention is not limited thereto.

The guide portion 244 may protrude from the surface that confronts the battery cells 10 and may generally correspond to the external appearance of the battery cell 10 mounted on the bottom plate 240. In the process of manufacturing the battery module 200 according to this embodiment, the guide portion 244 guides the mounting position of the battery cell 10. Thus, the alignment of the plurality of battery cells 10 can be effectively performed, thereby improving the production efficiency of the battery module 200.

Figure 4:
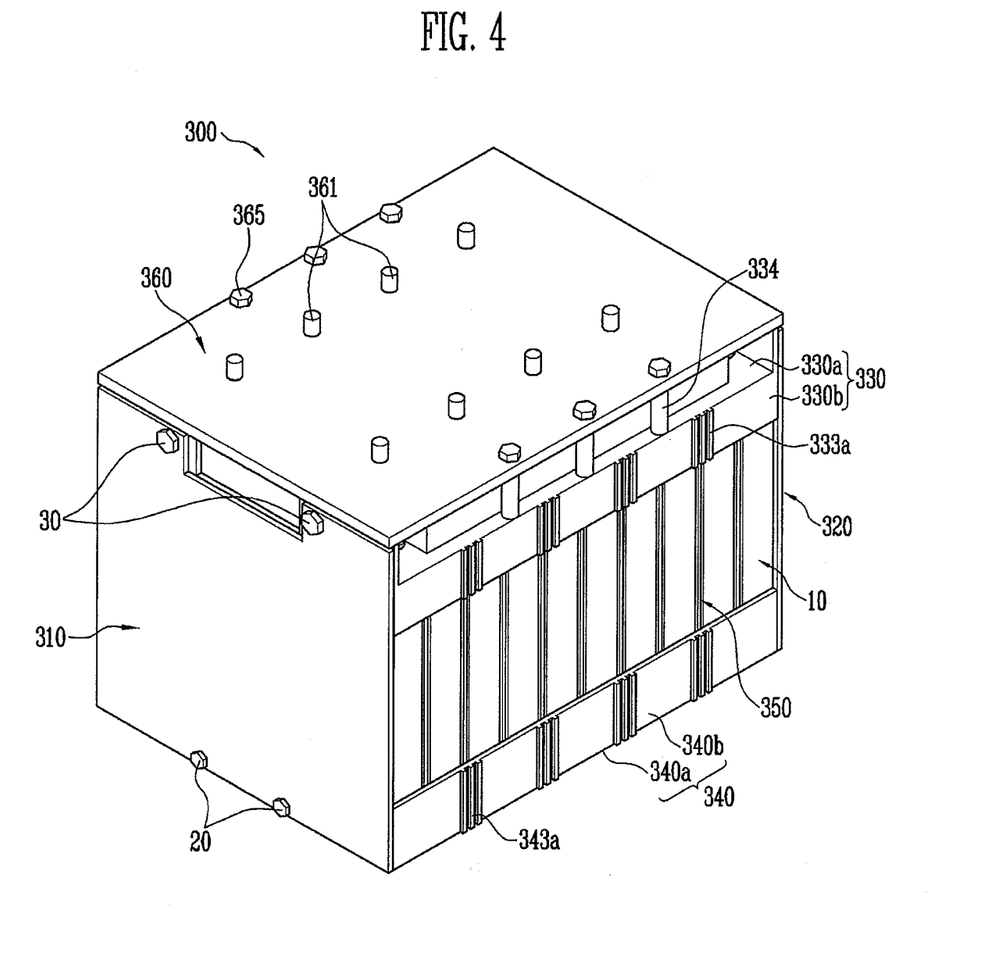
FIG. 4 is a perspective view of a battery module according to a third embodiment of the present invention.

FIG. 4 is a perspective view of a battery module according to a third embodiment of the present invention.

Referring to FIG. 4, the battery module 300 according to this embodiment may include a plurality of battery cells 10, a pair of end plates 310 and 320, a top plate 330, a bottom plate 340, and a top cover 360 that covers a top of the top plate 330.

Here, the top cover 360 is provided with at least one insertion bore and is fastened to an upper portion of the battery module 300 using a fastening member 365 such as a bolt, inserted into the insertion bore. More specifically, the fastening member 365 may be inserted into an insertion hole 334 and may protrude from a side of the top plate 330 so that the top cover 360 is fastened to the upper portion of the battery module 300.

At least one projection portion 361 may be provided on a top surface of the top cover 360. A projection accommodating portion 345 (see FIG. 5A) formed at a position corresponding to the projection portion 361 may be provided on a bottom base portion 340a of the bottom plate 340. The projection portions 361 provided on the top cover 360 and the projection accommodating portion 345 provided on the bottom base portion 340a of the bottom plate 340 can vertically connect a plurality of battery modules 300 to one another.

First ribs 333a and 343a and second ribs 343b (see FIG. 4) may be provided on outer surfaces of a top flange portion 330b of the top plate 330 and a bottom flange portion 340b of the bottom plate 340. The first ribs 333a and 343a and the second ribs 343b can be used to horizontally connect a plurality of battery modules 300 to one another.

The projection portions 361 and the projection accommodating portions 345 will be described in detail in FIGS. 5A and 5B. The first ribs 333a and 343a and the second ribs 343b will be described in detail in FIGS. 6A and 6B.

Figure 5A:
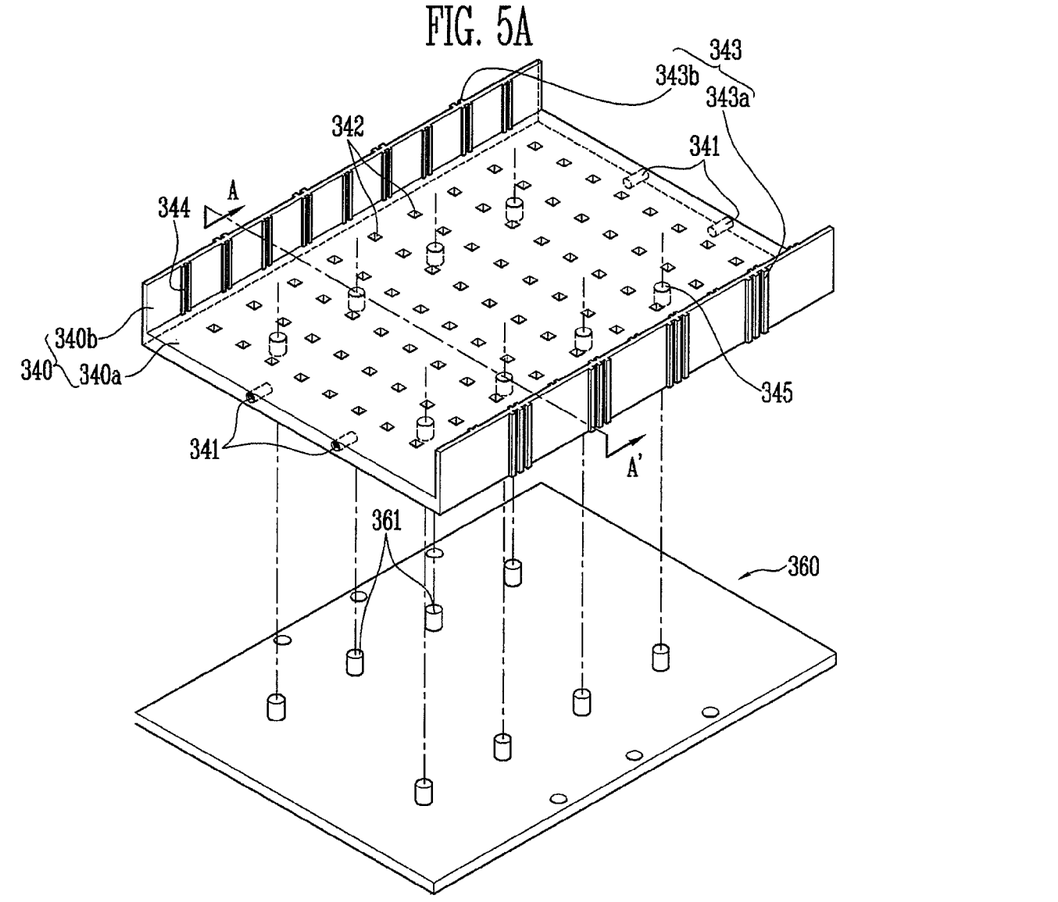
FIG. 5A is a perspective view showing top and bottom plates joined together according to the third embodiment of the present invention.

FIG. 5A is a perspective view showing a state that top and bottom plates are joined together according to the third embodiment of the present invention. FIG. 5B is a sectional view taken along line A-A' of FIG. 5A.

Figure 5B:
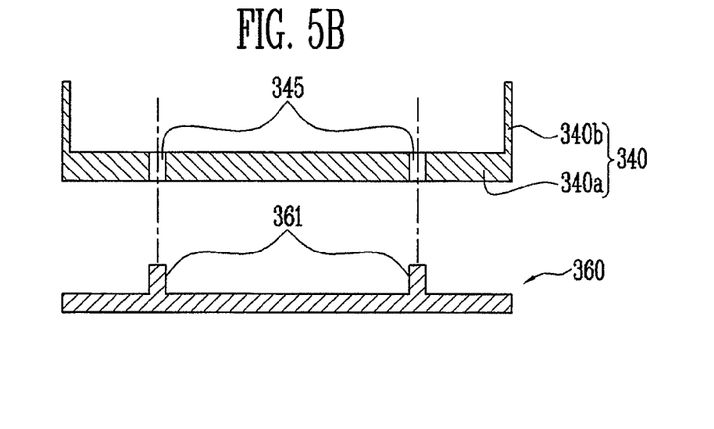
FIG. 5B is a sectional view taken along line A-A' of FIG. 5A.

Referring to FIGS. 5A and 5B, the at least one projection portion 361 is provided on the top surface of the top cover 360, and the projection accommodating portion 345 formed at the position corresponding to the projection portion 361 of the top cover 360 is provided on the bottom base portion 340a of the bottom plate 340. In this embodiment, the projection accommodating portion 345 is formed as a penetrated hole with a size corresponding to the projection portion 361. However, it will be apparent that the projection accommodating portion 345 may be formed as a groove with a shape corresponding to the projection portion 361.

When a plurality of battery modules 300 (see FIG. 4) configured as described above are vertically connected to one another, the at least one projection portion 361 provided on the top cover 360 in one battery module 300 may be insertedly coupled to the projection accommodating portion 345 formed at the position corresponding to the projection portion 361 in the bottom base portion 340a of the bottom plate 340 of another battery module 300. Accordingly, the bottom plate 340 of one battery module 300 is adhered closely to the top cover 360 of another battery module 300, so that their coupling state can be maintained.

In one embodiment, the height of the projection portion 361 may be less than the thickness of the bottom base portion 340a. Accordingly, it is possible to prevent the projection portion 361 from protruding from a top surface of the bottom base portion 340a when the projection portion, 361 is coupled to the projection accommodating portion 345.

Figure 6A:
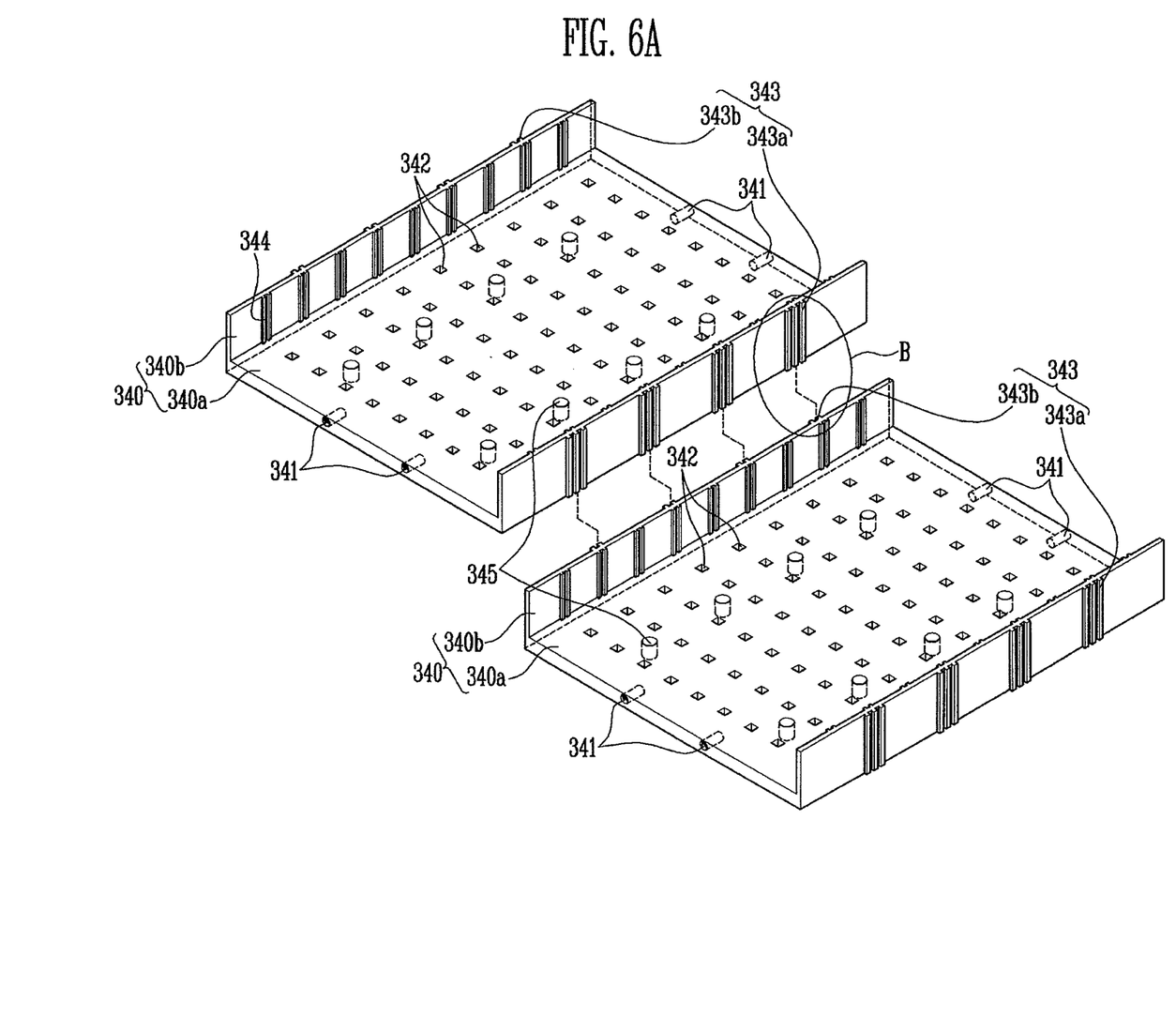
FIG. 6A is a perspective view showing two bottom plates being joined together according to the third embodiment of the present invention.
Figure 6B:
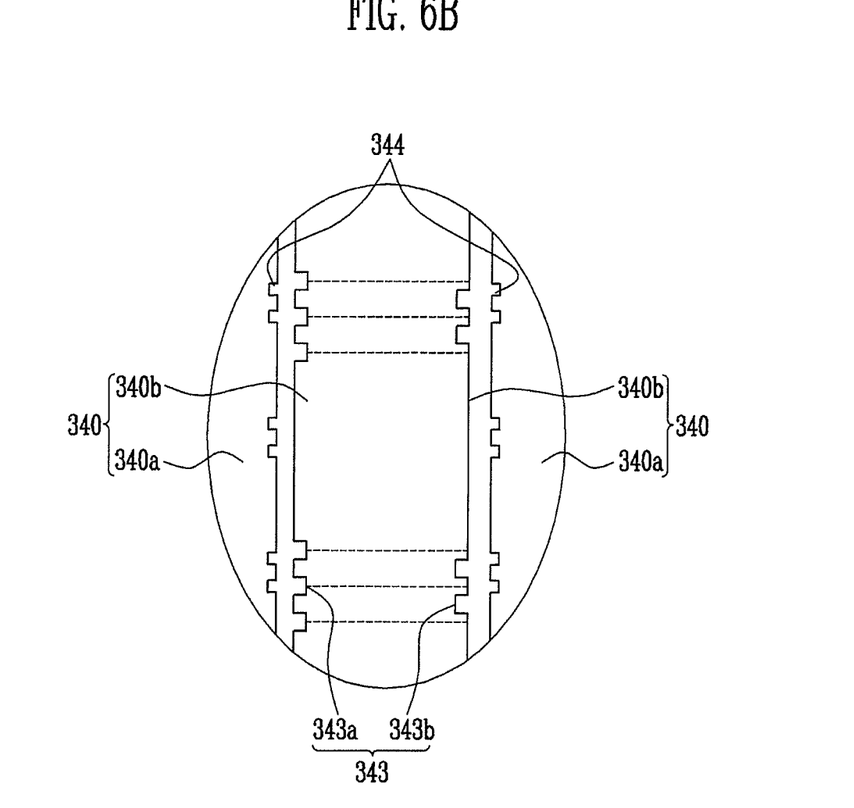
FIG. 6B is a plan view of portion B of FIG. 6A.

FIG. 6A is a perspective view showing a state that two bottom plates are joined together according to the third embodiment of the present invention. FIG. 6B is a plan view of portion B viewed from the top.

Referring to FIGS. 6A and 6B, the plurality of first ribs 343a may be provided on one outer surface of the bottom flange portion 340b of the bottom plate 340. The first ribs 343a function to reinforce the strength of the bottom plate 340, and may be used when the plurality of battery modules 300 are connected to one another.

In other words, the first ribs 343a are provided on the one outer surface of the bottom flange portion 340b, and the second ribs 343b respectively corresponding to spaces between the plurality of first ribs 343a may be provided on another outer surface of the bottom flange portion 340b. Accordingly, when the plurality of battery modules 300 (see FIG. 4) are connected to one another, the first and second ribs 343a and 343b are insertedly coupled to each other, so that their coupling state can be maintained.

More specifically, the plurality of first ribs 343a protrude from one outer surface of the bottom flange portion 340b so that three first ribs 343a are adjacent to one another. The three first ribs 343a are spaced apart from one another and second ribs 343b spaced to fit into the interval between the adjacent first ribs 343a may be provided on an outer surface of another bottom flange portion 340b. The plurality of second ribs 343b protrude from the other bottom flange portion 340b so that two second ribs 343b are adjacent to each other. The adjacent two second ribs 343b may be formed to correspond to and be insertable into the respective spaces between the adjacent three first ribs 343a.

Therefore, when the plurality of battery modules 300 are horizontally connected to one another, the first ribs 343a provided on one outer surface of the bottom flange portion 340b in one battery module 300 may be insertedly coupled to the second ribs 343b provided at a position on another outer surface of the bottom plate 340b of another battery module 300. Accordingly, the bottom plate 340 of one battery module 300 is adhered closely to the bottom plate 340 of another battery module 300, so that their coupling state can be maintained.

In this embodiment, the first or second ribs 343a or 343b are provided on the bottom flange portion 340b. However, it will be apparent that the first or second ribs 343a or 343b may be provided on the top flange portion 340a. The number of the first and second ribs 343a and 343b is not particularly limited as long as they are insertedly coupled to each other.

Figure 7:
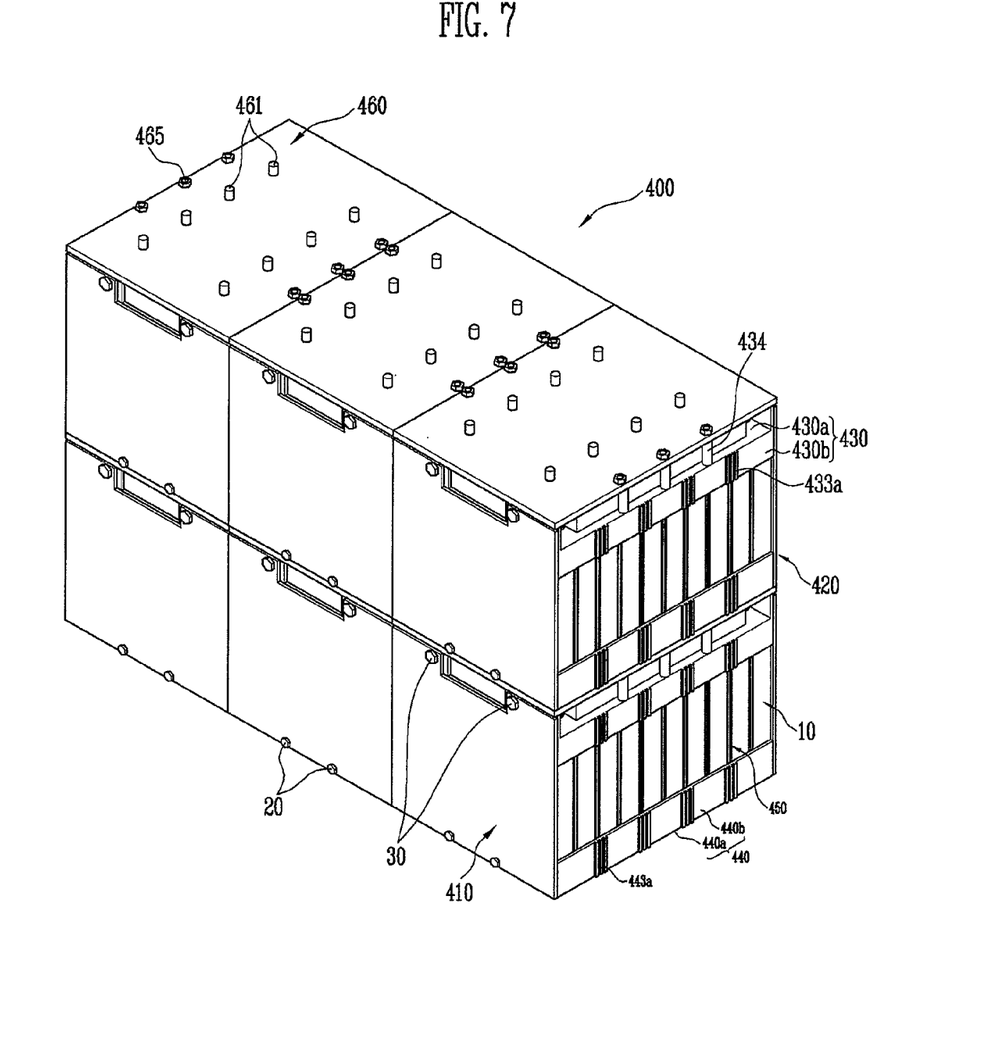
FIG. 7 is a perspective view of a battery pack according to a fourth embodiment of the present invention.

FIG. 7 is a perspective view of a battery pack according to a fourth embodiment of the present invention.

Referring to FIG. 7, the battery pack 400 according to this embodiment may be manufactured in an aligned form by electrically and physically connecting a plurality of battery modules to one another. Here, top and bottom plates 430 and 440 of each of the battery modules may be respectively provided with top and bottom flange portions 430b and 440b bent to side surfaces of battery cells 10. Accordingly, it is possible to prevent the battery cells 10 from moving in left and right directions without side plates.

As shown in FIG. 7, the battery pack 400 may be manufactured in the form of two rows and three columns by vertically and horizontally connecting a plurality of battery modules.

That is, first ribs 433a and 443a respectively provided on one outer surfaces of top and bottom flange portions 430b and 440b in one battery module are insertedly coupled to second ribs 343b (see FIG. 6A) provided on other outer surfaces of the top and bottom plates 430b and 440b in another battery module, so that the connection between adjacent battery modules in a horizontal (lateral) direction can be performed. Projection portions 461 (shown on a top cover 460) in one battery module are insertedly coupled to projection accommodating portions 345 (see FIG. 5A) provided on a bottom base portion 440a, so that the connection between adjacent battery modules in a vertical (longitudinal) direction can be performed.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery module comprising:
a pair of end plates;
a plurality of battery cells aligned with each other between the pair of the end plates, wherein each of the battery cells has a top surface, a bottom surface located substantially opposite to the top surface, and side surfaces extending between the top surface and the bottom surface;
a top plate having a top base portion extending across the top surface of the battery cells and a top flange portion covering at least a portion of the side surfaces of the battery cells;
a bottom plate having a bottom base portion extending across the bottom surface of the battery cells and a bottom flange portion covering at least a portion of the side surfaces of the battery cells; and
a first guide portion protruding from at least one of the top flange portion or the bottom flange portion between two adjacent ones of the battery cells.

2. The battery module according to claim 1, wherein the top flange portion and the bottom flange portion are spaced from each other.

3. The battery module according to claim 1, wherein the top plate and the bottom plate comprise an electrically insulating material.

4. The battery module according to claim 1, wherein the top plate and the bottom plate comprise at least one selected from the group consisting of acrylonitrile butadiene styrene (ABS), polystyrene (PS), polypropylene (PP), polyimide (PI) and polyethylene (PE).

5. The battery module according to claim 1, wherein the top flange portion of the top plate and the bottom flange portion of the bottom plate comprise the first guide portion and a second guide portion respectively protruding toward the battery cells, wherein each of the first and second guide portions are located adjacent to one of the battery cells.

6. The battery module according to claim 1, wherein the pair of end plates each further comprise fastening holes.

7. The battery module according to claim 6, wherein the top plate and the bottom plate each have a fastening groove located adjacent to a corresponding one of the fastening holes.

8. The battery module according to claim 7, wherein the fastening groove is coupled to the corresponding one of the fastening holes by a fastening member.

9. The battery module according to claim 8, wherein the fastening member comprises a bolt or a stud.

10. The battery module according to claim 1, further comprising a barrier located between adjacent ones of the plurality of battery cells, and wherein the bottom plate has at least one opening generally corresponding to the barrier.

11. The battery module according to claim 1, further comprising a top cover that covers the top plate.

12. The battery module according to claim 11, wherein at least one projection portion is provided on the top cover.

13. The battery module according to claim 12, wherein a projection accommodating portion is provided on the bottom base portion to generally correspond to another projection portion on a top cover of another battery module.

14. The battery module according to claim 1, further comprising a plurality of first ribs on an exterior-facing surface of a first one of the top flange portion or the bottom flange portion, wherein the first ribs are spaced from each other, and a plurality of second ribs on an exterior-facing surface of a second one of the top flange portion or the bottom flange portion, wherein the plurality of second ribs are spaced to fit into spaces between corresponding ribs of an adjacent battery module.

* * * * *